April 29, 1958   J. E. BERRY   2,832,884
LIGHT BEAM MODULATOR

Filed June 30, 1955   2 Sheets-Sheet 1

Jack E. Berry
INVENTOR.

April 29, 1958
J. E. BERRY
2,832,884
LIGHT BEAM MODULATOR
Filed June 30, 1955
2 Sheets-Sheet 2
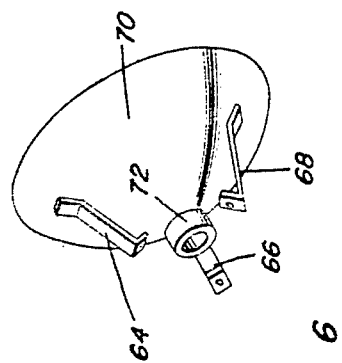
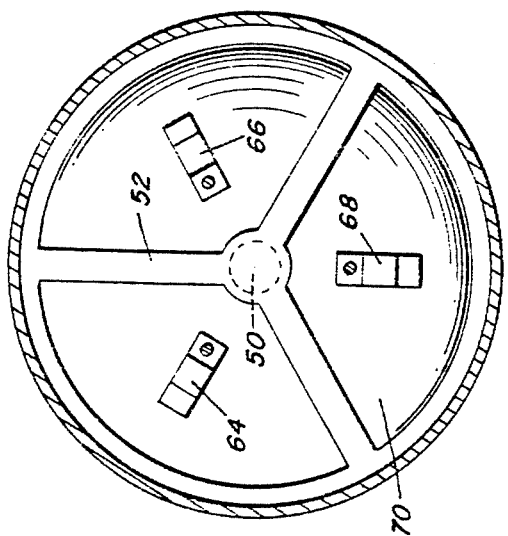
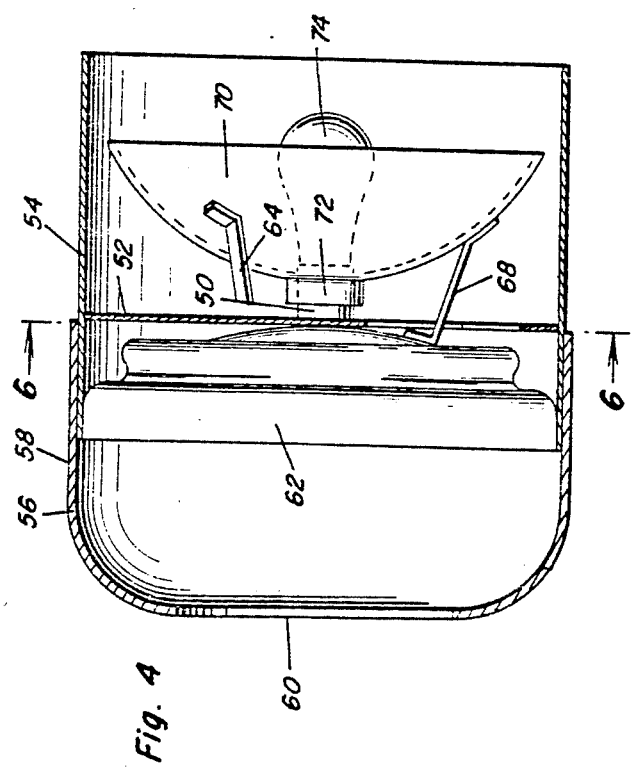
Jack E. Berry
INVENTOR.

United States Patent Office

2,832,884
Patented Apr. 29, 1958

2,832,884

LIGHT BEAM MODULATOR

Jack E. Berry, Sherman Oaks, Calif.

Application June 30, 1955, Serial No. 519,080

7 Claims. (Cl. 250—7)

This invention relates to a device adapted to be utilized in modulating light for various purposes.

The primary object of the present invention resides in the provision of an apparatus designed to enable a light beam to be modulated so that its impact on various apparatus such as a screen or the like can be measured by any suitable means such as photo-electric cells or the like, the modulation of the light being responsive to a suitable signal such as audible or other frequency vibrations or mechanical or electrical vibrations or the like thus enabling the light modulation apparatus to be utilized in measuring the intensity of the signals applied thereon.

A further object of the invention resides in the provision of a novel vibratory mounting of a lamp with respect to a parabolic reflector to thereby enable the relative position of the lamp and the parabolic reflector to be intermittently changed in response to the vibratory signal applied on a diaphragm to thereby cause the modulation of the light beam.

The construction of this invention features the utilization of a diaphragm to which a reflector or the light source is attached so that the reflector and the light source may be vibrated to cause the modulation of the light beam in response to the amplitude or intensity of the signal provided on the diaphragm.

Still further objects and features of this invention reside in the provision of a light beam modulator that is simple in construction, highly efficient in operation, and which is relatively inexpensive to construct.

These, together with the various ancillary objects and features of the invention which will become apparent as the following description proceeds, are attained by this light beam modulator, preferred embodiments of which have been illustrated in the accompanying drawings, by way of example, wherein:

Figure 4 is a vertical sectional detail view similar to that of Figure 3 illustrating a modified form of the invention with the reflector secured to the diaphragm by suitable tie rods;

Figure 5 is a perspective view illustrating in particular the construction and arrangement of the tie rods; and Figure 6 is a vertical sectional detail view as taken along the plane of line 6—6 in Figure 4.

Figure 2:
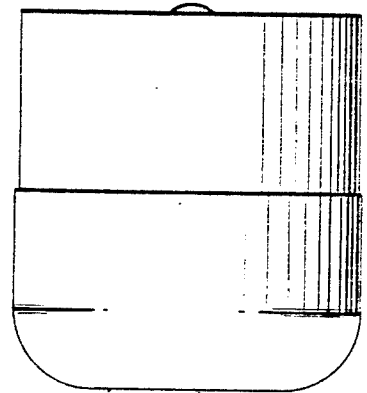
Figure 2 is a side elevational view of the light beam modulator.
Figure 1:
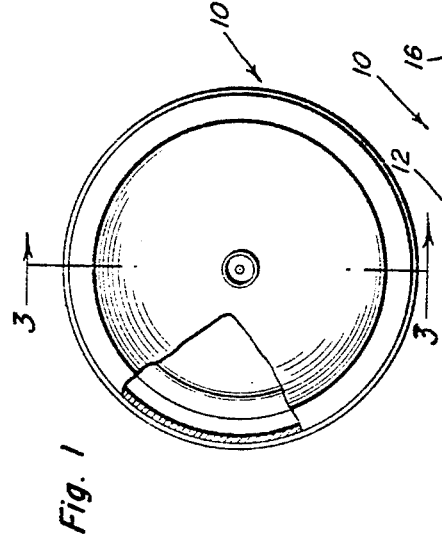
Figure 1 is a rear elevational view of the light beam modulator constructed in accordance with the concepts of the present invention with portions thereof being broken away to show other portions in section.
Figure 3:
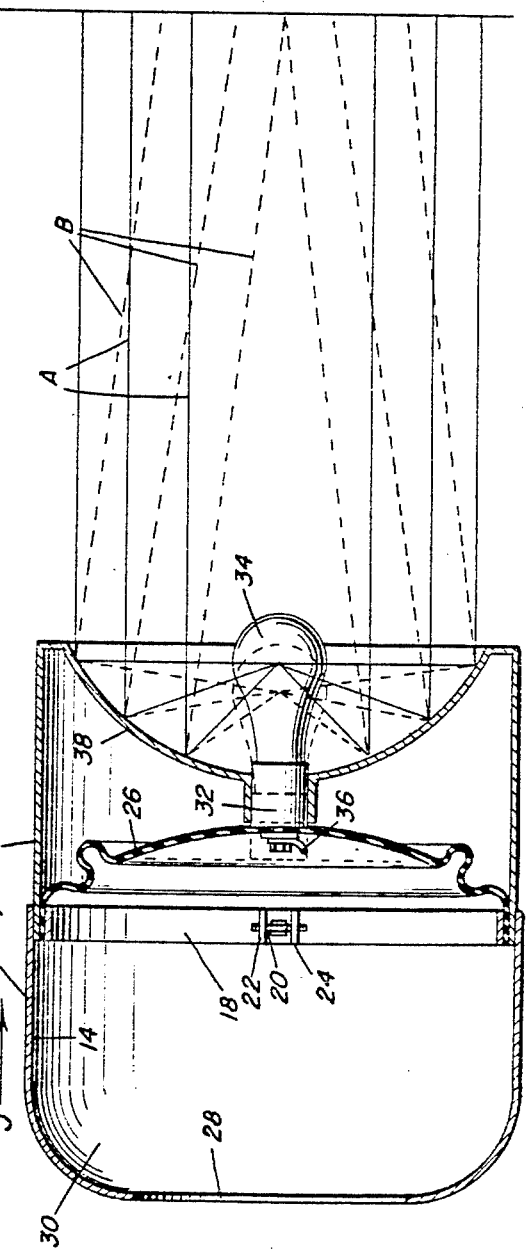
Figure 3 is a vertical sectional view as taken along the plane of line 3—3 in Figure 1 and showing in an enlarged scale the interior construction of one form of light beam modulator having the light source attached to the diaphragm.

With continuing reference to the accompanying drawings wherein like reference numerals designate similar parts throughout the various views, and with initial attention directed to the embodiments of the invention as shown in Figures 1 through 3, reference numeral 10 generally designates the light beam modulator comprising one of the embodiments of the present invention. This light beam modulator includes a housing 12 formed in two parts 14 and 16. A clamping member 13 having threaded clamping elements 20 extending through flanges 22 and 24 on the clamping ring 18 is provided for not only holding the sections 14 and 16 in engagement with each other by forcing the edge of the member 16 into frictional engagement with the inner wall of the section 12 but also serves to hold a diaphragm 26 in position.

The diaphragm 26 is of any suiatble resilient material such as rubber or synthetic plastic material and there is provided an aperture 28 in the section 14 of the housing 12 in communication with the interior of the housing and therefore in communication with the diaphragm 26. Thus, sound waves in the vicinity of the light beam modulator 10 can be transmitted to the diaphragm 26 by air through the aperture 28.

It is to be recognized that an advantage of this invention lies in the fact that adjustment of the clamping ring 18 permits a sliding adjustment of the housing section 14 relative to the housing section 16 and therefore relative to the diaphragm 26. This allows the chamber 30 formed by the diaphragm 26 and the inner walls of the housing section 14 to be varied in size thereby enabling the chamber 30 to become harmonic with various selected frequencies.

Attached to the diaphragm 26 is a lamp socket 32 in which a lamp bulb 34 is secured and connected through suitable connectors 36 to a suitable source of electrical power. Rigidly attached to the casing section 16 in any suitable manner is a parabolic reflector 38. The light bulb 34 is so positioned that the light rays emanating therefrom originate at the focus of the parabolic reflector 38 thus causing the light rays A to be directed parallel to each other. However, when the diaphragm 26 is vibrated, the light beams will be directed in a path other than parallel to each other as is indicated at B in Figure 3 wherein the light rays are shown to be convergent when the light bulb 34 is directed inwardly toward the reflector 38.

In Figure 4 there is shown a modification of the invention in which the lamp socket 50 is rigidly mounted on a bracket 52 secured to the inner walls of a housing section 54. Another housing section 56 forms in conjunction with the housing section 54 the housing 58 and the housing section 56 is provided with an aperture 60 therethrough. A suitable diaphragm 62 is mounted in the housing 58 and has attached thereto by three angle shaped brackets 64, 66 and 68 the reflector 70. The reflector 70 has a collar 72 slidable with respect to the socket 50 and the lamp bulb 74 is positioned at the focus of the parabolic reflector 70.

Obviously, the vibration of the diaphragm 62 will cause the reflector 70 to be vibrated causing therefore a displacement of the reflector 70 thus modulating the light beam emanating therefrom.

Obviously, it is within the concept of this invention to substitute other means for actuating the diaphragms 26 or 62 as may be desired. In addition it is within the scope of this invention to construct the apparatus without a diaphragm but rather with other methods of vibrating the light source or reflector such as an electromagnet, mechanical linkage or the like.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A light beam modulator comprising a reflector having a focus, a light source normally positioned at the focus of said reflector, a diaphragm, means for vibrating said diaphragm, said reflector being mounted on said diaphragm to intermittently displace said light source with respect to said reflector.

2. A light beam modulator comprising a reflector having a focus, a light source normally positioned at the focus of said reflector, a diaphragm, means for vibrating said diaphragm, said light source being mounted on said diaphragm to intermittently displace said light source with respect to said reflector.

3. A light beam modulator comprising a housing having a reflector therein, said reflector having a focus, a light source normally positioned at the focus of said reflector, a diaphragm positioned in said housing, said housing having an opening therein in communication with said diaphragm, sad reflector being mounted on said diaphragm to intermittently displace said light source with respect to said reflector.

4. A light beam modulator comprising a housing havin a reflector therein, said reflector having a focus, a light source normally positioned at the focus of said reflector, a diaphragm positioned in said housing, said housing having an opening therein in communication with said diaphragm, said light source being mounted on said diaphragm to intermittently displace said light source with respect to said reflector.

5. A light beam modulator comprising a housing having a reflector therein, said reflector having a focus, a light source normally positioned at the focus of said reflector, a diaphragm positioned in said housing, said housing having an opening therein in communication with said diaphragm, said reflector being mounted on said diaphragm to intermittently displace said light source with respect to said reflector, and means for adjusting the size of said housing.

6. A light beam modulator comprising a housing having a reflector therein, said reflector having a focus, a light source normally positioned at the focus of said reflector, a diaphragm positioned in said housing, said housing having an opening therein in communication with said diaphragm, said light source being mounted on said diaphragm to intermittently displace said light source with respect to said reflector, and means for adjusting the size of said housing.

7. A light beam modulator comprising a reflector having a focus, a light source positioned at the focus of said reflector, and vibratory means including a diaphragm for intermittently displacing said light source with respect to said reflector.

References Cited in the file of this patent

UNITED STATES PATENTS 235,496    Bell et al. _____ Dec. 14, 1880